Feb. 13, 1945.  C. M. JOHNSON  2,369,297
FASTENER
Filed Feb. 5, 1944
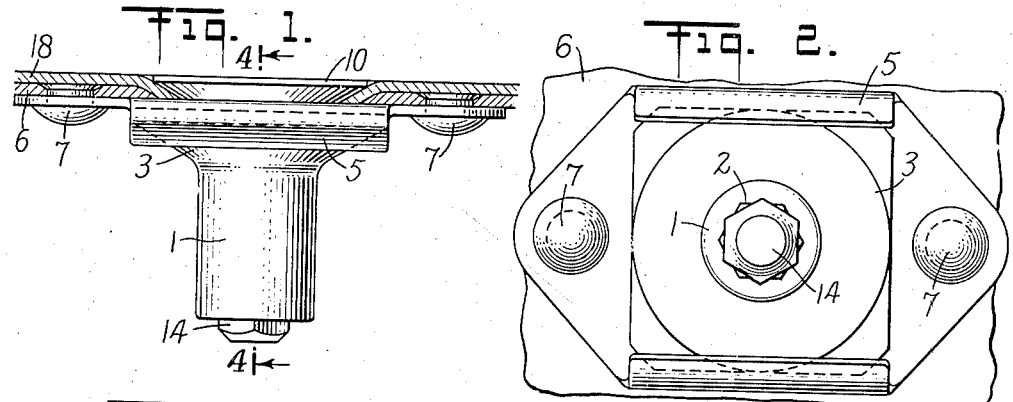
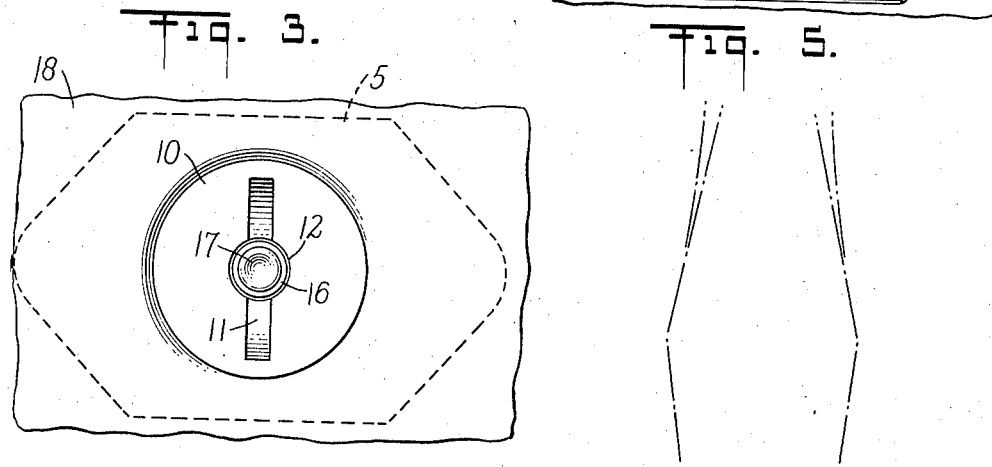
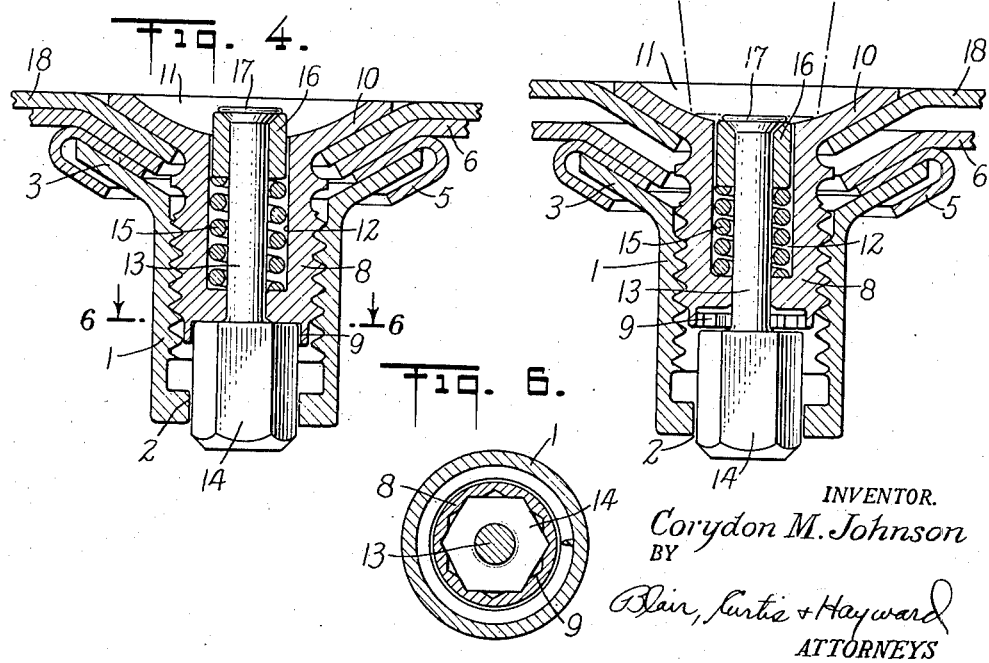
INVENTOR.
Corydon M. Johnson
BY
Blair, Curtis & Hayward
ATTORNEYS Patented Feb. 13, 1945

2,369,297

UNITED STATES PATENT OFFICE 2,369,297

FASTENER

Corydon M. Johnson, Freeport, N. Y.

Application February 5, 1944, Serial No. 521,177

8 Claims. (Cl. 24—221)

This invention relates to a structural fastener and particularly to one that is adapted to secure two sheet metal elements such as the elements of a cowl together.

An object of the invention is to provide a fastener of this type which, when it is in fastening position, will constitute a rigid structure which will positively secure the sheet metal elements together.

A further object of the invention resides in the provision of such a device that will adapt itself to sheet metal elements of various thicknesses.

A further object of the invention resides in so relating the elements of the fastener that during application they will automatically engage each other even though initially misaligned.

A still further object of the invention resides in providing means for locking the fastener elements together, which means automatically comes into play immediately upon the assembly of the fastener elements, regardless of whether or not they have been completely adjusted to secure the sheet metal plates together.

With these and other objects in view that will appear as the description progresses, my invention resides in the combination and arrangement of parts illustrated in the drawing, described in the specification and set forth in the claims.

While I will describe the fastener as useful in connection with the fastening of the two elements of a cowl together, it is of course to be understood that it is not to be limited to this use.

In the drawing:

Figure 1 is an elevation of the fastener showing the same in the position that it occupies when fastening the sheet metal elements together.

Figure 2 is a bottom plan view.

Figure 3 is a top plan view.

Figure 4 is a sectional view on line 4—4 of Figure 1, showing the relative positions of the parts when the fastener is operated to secure the two sheet metal plates together.

Figure 5 is a view similar to Figure 4 but with parts in the positions that they will occupy while the fastener is being adjusted to its locking position; in this figure a portion of a screw driver being shown in broken lines to illustrate the manner in which the assembly takes place.

Figure 6 is a section on line 6—6 of Figure 4.

The form of fastener illustrated in the drawing includes a nut 1 which is internally screw threaded with a screw such as a Whitworth screw and which is provided at its outer end with a multi-angular opening 2. This nut 1 is provided with an outwardly extending flange 3 that is inclined with respect to the axial center of the nut. The nut is floatingly mounted in a basket 5 that is adapted to be secured to one of the sheet metal plates 6 by suitable means such as rivets 7. An externally threaded male member or screw 8 is adapted to engage with the internal threads of the nut 1 and on its ends adjacent the multi-angular end of the nut is provided with a multi-angular socket 9, the number of angles preferably corresponding to the number of angles of the opening 2 of the nut 1. The opposite end of the screw 8 is provided with a head 10 in which a slot 11 for the reception of a screw driver or other operating implement is located. This screw 8 has a central bore 12 which extends inwardly from the head 10, is closed at its inner end but is open at the head end. A plunger 13 is axially mounted in the bore 12 and extends through the end of the screw 8 into the nut 1. The end of this plunger is provided with a key 14, the face of which is angular in form, in the present instant being hexagonal.

Normally the key 14 is urged into engagement with the angular faced socket 9 by a spring 15 which is interposed between the closed end of the bore 12 and a retainer 16 whose outward movement on the plunger 16 is limited by a spun head 17. The length of the key 14 is such that when the male or screw member 8 of the fastener is engaged with the female or nut member 1 and the key is engaged with the socket 9 it will also be engaged with the angular faces of the opening 2 in the nut 1.

In assembling the fastener to secure the removable cowl element 18 to the fixed cowl element 6, after the two have been placed in their overlapping relationship and the nut 1 has been secured permanently to element 6, for instance, the male or screw member 8, which at this time is completely disengaged from the nut 1 and carries the plunger 13 with its key 14, is inserted through the openings in the elements 18 and 6 until threads on the male or screw member 8 engage with the threads on the female or nut member 1.

If, because of distortion of the elements 18 and 6, the nut 1 and the screw 8 are not in perfect axial alignment, they will automatically be brought into such alignment as the screw is turned, as, for instance, by the screw driver because of the freedom of movement of the flange 3 in the basket 5.

Pressure on the operating implement, such as the screw driver, after the screw threads have been initially engaged, will depress the plunger 13 and move the key 14 from the socket 9, and the continued pressure exerted while the screw 8 is being engaged with the nut will maintain this key out of the socket 9 against the action of the spring 15, so that the male member or screw will be free to turn to draw the element 18 into engagement with the element 6, element 18 being clinched into the neck of the screw 8 to secure the element 18 to the screw.

After the initial engagement of the threads of the screw 8 and nut 1, the key 14, because of its length, will engage in the multi-angular opening 2 of the nut so that the plunger 13 and key will not turn during the turning of the screw.

As soon, however, as the pressure on the screw is released by the operating implement the spring 15 will move the key 14 inwardly, not out of engagement with the multi-angular face of the opening 2, but into engagement with the multi-angular face of the socket 9. Thus the key will lock the screw 8 and the nut 1 together.

When in this position with the head or skirt 10 drawn tightly against the plate 18, the elements or plates 6 and 18 will be positively secured together, as will also the screw 8 and the nut 1, so that there will be no give between the elements of the fastener to permit movement between the plates and this rigid connection will be maintained because of the inability of the screw 8 and the nut 1 to have relative movement, due to the engagement of the key 14 with the angular face of the opening 2 of the nut and the angular face of the socket 9.

It will be realized that if at any time after the initial engagement of the screw with the nut and the insertion of the key 14 into the opening 2, and even before the two elements have been drawn tightly against each other, pressure is released from the screw by the removal of the operating implement or the relieving of pressure on it, the spring 15 will immediately come into operation and engage the key 14 with the socket 9 while still maintaining the engagement of the key with the angular faces of the opening 2. Thus, if for any reason the two elements of the fastener are not drawn tightly together, they nevertheless will be positively locked together and maintain the two sheet metal plates in their engaging relationship.

What I claim is:

1. A separable fastener adapted to extend through aligned apertures in and to secure superimposed plate elements together which includes: a retainer-basket adapted to be secured to one of said elements, an internally threaded nut having a flange loosely retained in said retainer-basket and having a polysided opening in one end thereof, a screw member having external screw threads adapted to engage the screw threads of the nut and to penetrate the nut to different degrees, said screw member having a head on one end thereof adapted to engage another of the plate elements and having a socket at the other end thereof, a plunger extending axially of and within the screw member and having a polysided key on the end thereof adjacent said socket and adapted to slidably move within the polysided opening in the nut, the socket having a plurality of angular seats at least equal in number and complemental to the angles of the key to receive the key, and a spring surrounding said plunger and adapted normally to urge the key into the socket with the angular portions thereof seated in the angular seats of the socket in various positions of penetration of the screw member into the nut while the key extends into the polysided opening in the nut whereby the nut and screw member are locked against relative rotation.

2. A separable fastener adapted to extend through aligned apertures in and to secure superimposed plate elements together which includes: an internally threaded nut adapted to be secured to one of said plates and having a polysided opening in one end thereof, a screw member having external screw threads adapted to engage the screw threads of the nut and to penetrate the nut to different degrees, said screw member having a head on one end thereof adapted to engage another of the plate elements and having a socket at the other end thereof, a plunger extending axially of and within the screw member and having a polysided key on the end thereof adjacent said socket and adapted to slidably move within the polysided opening in the nut, the socket having a plurality of angular seats at least equal in number and complemental to the angles of the key to receive the key, and a spring surrounding said plunger and adapted normally to urge the key into the socket with the angular portions thereof seated in the angular seats of the socket in various positions of penetration of the screw member into the nut while the key extends into the polysided opening in the nut whereby the nut and screw member are locked against relative rotation.

3. A separable fastener adapted to extend through aligned apertures in and to secure superimposed plate elements together which includes: an internally threaded nut, an externally threaded screw member adapted to engage with the nut member to different degrees of penetration, said screw member and said nut member having irregularly shaped adjacent openings, a key having faces complemental to the faces of said openings, slidably mounted within the opening in the nut, and adapted to engage the opening in the screw member while in engagement with the opening in the nut member, and means normally urging the key into engagement with the opening in the screw member.

4. A separable fastener adapted to extend through aligned apertures in and to secure superimposed plate elements together which includes: an internally threaded nut, an externally threaded screw member adapted to engage with the nut member to different degrees of penetration, said screw member and said nut member having irregularly shaped adjacent openings, a key having faces complemental to the faces of said openings, slidably mounted within the opening in the nut, and adapted to engage the opening in the screw member while in engagement with the opening in the nut member, means normally urging the key into engagement with the opening in the screw member, and a plunger extending from the key through the screw member by which force may be transmitted against the action of the spring to move the key from the opening in the screw member to permit the relative rotation of the screw member and nut.

5. A separable fastener adapted to extend through aligned apertures in and to secure superimposed plate elements together which includes: an internally threaded nut, an externally threaded screw member adapted to engage the said nut to different degrees of penetration, slidable means adapted to positively engage the nut and screw member to lock the same against relative rotation, a slotted head on said screw member, a plunger connected with said slidable locking means and extending through the screw member into the screw head, resilient means for urging the slidable locking member into engagement with the screw member while maintaining its engagement with the nut and for urging the end of the plunger remote from the slidable member toward the surface of the screw head whereby when a screw driver is engaged with the slot in the head and pressure is applied thereto the plunger will be moved against the action of the resilient means to effectuate a disconnection of the slidable locking means from the screw member to permit the screw member to be turned relative to the nut.

6. A separable fastener adapted to extend through aligned apertures in and to secure superimposed plate elements together which includes: an internally threaded nut, an externally threaded screw member adapted to engage said nut to different degrees of penetration, said nut and said screw member having polysided openings therein, a key adapted to engage in both openings to lock the nut and screw member against relative rotation, said screw member having a slotted head on the end thereof opposite said key, and means normally operable to engage said key with the opening in said screw member, which means includes a plunger having a portion extending into the slot of the screw head.

7. A separable fastener adapted to extend through aligned apertures in and to secure superimposed plate elements together which includes: an internally threaded nut, an externally threaded screw member adapted to engage said nut to different degrees of penetration, said nut and said screw member having polysided openings therein, a key adapted to engage in both openings to lock the nut and screw member against relative rotation, said screw member having a slotted head on the end thereof opposite said key, and means normally operable to engage said key with the opening in said screw member, which means includes a plunger having a portion extending into the slot of the screw head, said key and said openings having complemental polysided faces.

8. A separable fastener adapted to extend through aligned apertures in and to secure superimposed plate elements together which includes: an internally threaded nut, an externally threaded screw member adapted to engage said nut to different degrees of penetration, said nut and said screw member having polysided openings therein, a key adapted to engage in both openings to lock the nut and screw member against relative rotation, said screw member having a slotted head on the end thereof opposite said key, and means normally operable to engage said key with the opening in said screw member, which means includes a plunger having a portion extending into the slot of the screw head, said key and said openings having complemental polysided faces, the polysided faces of the opening in the screw member being at least equal in number to the polysided faces of the key.

CORYDON M. JOHNSON.